US011865583B1

(12) United States Patent  
DeGenova et al.

(10) Patent No.: US 11,865,583 B1  
(45) Date of Patent: *Jan. 9, 2024

(54) SYSTEMS AND METHODS FOR SEPARATING SOFT BURNED AND HARD BURNED CALCIUM OXIDE

(71) Applicant: Mississippi Lime Company, St. Louis, MS (US)

(72) Inventors: Mark DeGenova, Ste. Genevieve, MO (US); Randy J. Griffard, St. Mary, MO (US); David Venhaus, St. Jacob, IL (US)

(73) Assignee: Mississippi Lime Company, St. Louis, MO (US)

( * ) Notice: Subject to any disclaimer, the term of this patent is extended or adjusted under 35 U.S.C. 154(b) by 1384 days.

This patent is subject to a terminal disclaimer.

(21) Appl. No.: 16/378,216

(22) Filed: Apr. 8, 2019

Related U.S. Application Data

(63) Continuation of application No. 15/144,258, filed on May 2, 2016, now Pat. No. 10,307,766.

(60) Provisional application No. 62/155,923, filed on May 1, 2015.

(51) Int. Cl.
| | |
|---|---|
| B07B 13/04 | (2006.01) |
| C04B 2/10 | (2006.01) |
| B07B 7/00 | (2006.01) |
| B02C 23/38 | (2006.01) |
| B02C 23/14 | (2006.01) |

(52) U.S. Cl.  
CPC ............... B07B 13/04 (2013.01); B07B 7/00 (2013.01); C04B 2/10 (2013.01); B02C 23/14 (2013.01); B02C 23/38 (2013.01)

(58) Field of Classification Search  
CPC .......... B07B 13/04; B07B 7/00; B02C 23/08; C04B 2/10  
See application file for complete search history.

(56) References Cited

U.S. PATENT DOCUMENTS

| | | | |
|---|---|---|---|
| 3,643,932 A | 2/1972 | Corson et al. | |
| 3,929,417 A * | 12/1975 | Rosa | C01F 11/04 432/106 |
| 4,748,010 A | 5/1988 | Walker | |
| 10,307,766 B1 * | 6/2019 | DeGenova | B02C 23/38 |
| 2007/0104630 A1 | 5/2007 | Huege | |
| 2011/0105671 A1 | 5/2011 | Meade | |

* cited by examiner

Primary Examiner — Jeremy R Severson  
(74) Attorney, Agent, or Firm — Lewis Rice LLC

(57) ABSTRACT

Systems and methods to effectively sort calcined lime (quicklime) particles to produce products with more consistent size and burn time characteristics after the quicklime particles have been created and without the use of specialized additives. Specifically, such systems and methods sort the quicklime particles below a selected size into a softer burned and harder burned fraction based on their size. The fractions are burned in the kiln together and as a singular product, but can be classified from each other after calcining.

16 Claims, 4 Drawing Sheets

Hard Burned PQL Feed to Classifier

PQL Refinement Test (Figure 4)

| Sample I.D. | Cut Ratio | -325 Mesh | Slake Data | | | | | HELOS | | | | | | | HELOS | | BET Multi Pt | BET Pore Volume |
|---|---|---|---|---|---|---|---|---|---|---|---|---|---|---|---|---|---|---|
| | | | R/30 | R/180 | T/RISE | T/TIME | PSD 16 | PSD 50 | PSD 84 | PSD 90 | PSD 95 | PSD 98 | | 1.8 Micron | 3.1 Micron | | m2/g | cm3/g |
| Test 1 -- Feed | FEED | 65.85 | 9.7 | 28.6 | 46.2 | 652 | 2.71 | 16.16 | 65.26 | 81.62 | 102.06 | 123.50 | | 9.90 | 18.34 | | 1.13 | 0.005 |
| Test 2 -- Feed | | 64.57 | 10.2 | 29.0 | 46.8 | 667 | 2.78 | 16.80 | 67.15 | 83.60 | 104.45 | 125.76 | | 9.65 | 17.91 | | 1.04 | 0.005 |
| Test 3 -- Feed | | 66.28 | 9.3 | 26.7 | 45.2 | 705 | 2.84 | 16.84 | 65.47 | 81.64 | 101.79 | 122.86 | | 9.59 | 17.44 | | 0.93 | 0.006 |
| Test 1 -- Fine Cut | 21.7% | 99.43 | 17.7 | 57.4 | 60.5 | 248 | 1.77 | 4.40 | 8.97 | 10.73 | 13.32 | 16.69 | | 16.40 | 34.12 | | 1.77 | 0.007 |
| Test 2 -- Fine Cut | | 98.82 | 18.1 | 58.2 | 61.2 | 247 | 1.71 | 4.31 | 8.96 | 10.76 | 13.44 | 16.98 | | 17.20 | 35.20 | | 1.72 | 0.007 |
| Test 3 -- Fine Cut | | 99.38 | 17.7 | 56.8 | 60.5 | 259 | 1.77 | 4.34 | 8.91 | 10.66 | 13.27 | 16.64 | | 16.36 | 34.50 | | 1.72 | 0.013 |
| Test 1 -- Coarse Cut | 78.3% | 60.75 | 7.8 | 19.5 | 45.0 | 890 | 5.88 | 29.93 | 74.85 | 89.71 | 109.19 | 127.96 | | 6.28 | 10.61 | | 0.78 | 0.003 |
| Test 2 -- Coarse Cut | | 61.24 | 7.9 | 19.9 | 44.7 | 886 | 6.14 | 29.69 | 74.44 | 89.21 | 108.63 | 127.47 | | 6.13 | 10.33 | | 0.64 | 0.003 |
| Test 3 -- Coarse Cut | | 60.97 | 7.8 | 19.9 | 45.3 | 924 | 6.39 | 29.70 | 74.18 | 88.82 | 108.07 | 126.87 | | 5.99 | 10.04 | | 0.90 | 0.003 |

| R/180 | Type Burn |
|---|---|
| >40 | SOFT |
| 30 to 40 | MEDIUM |
| <30 | HARD |

US 11,865,583 B1

SYSTEMS AND METHODS FOR SEPARATING SOFT BURNED AND HARD BURNED CALCIUM OXIDE

CROSS REFERENCE TO RELATED APPLICATION(S)

This application is a Continuation of U.S. Utility patent application Ser. No. 15/144,258 filed May 2, 2016, which claims the benefit of U.S. Provisional Patent Application Ser. No. 62/155,923, filed May 1, 2015. The entire disclosure of all the above documents is herein incorporated by reference.

BACKGROUND OF THE INVENTION

1. Field of the Invention

This disclosure is related to the field of quicklime production and products, specifically to segregation of quicklime (calcium oxide) into compositions which are soft burned versus those that are hard burned in the calcining process.

2. Description of the Related Art

Calcium oxide, which is commonly referred to as quicklime (or even just lime), is an incredibly useful compound with a storied history in a variety of industrial applications in all sorts of areas. These uses range from many years ago where it was heated to produce stage lighting (where the term "lime light" comes from) and as a building mortar for stone structures, to more modern uses where it is an essential component of building materials such as cement, concrete, and plaster.

Outside of the most common construction uses, quicklime is explosively reactive to water, which can make it dangerous to handle or to be exposed to and is even believed to have been weaponized in the ancient world. However, quicklime's fast reaction time with certain chemicals also makes it very useful as a part of a large number of industrial chemical processes and operations such as gas scrubbing, biofuel refining, and rubber manufacture, where quicklime can be used to carry out a particular reaction quickly. In these types of processes, the quicklime is commonly used as a reactant or as a catalyst. While many of these processes have the simple requirement that faster reacting is better, it is often more important that the reactivity of quicklime be known and consistent, than that it be particularly fast or slow.

If the quicklime is not sufficiently reactive (low reactive), it can remain in an unreacted form after the reaction to which it is connected is completed. This can result in the quicklime being a contaminant or waste product in the result. If it is too reactive, it is also possible that the quicklime can have undesired effects on the process due to it reacting too quickly or reacting with products (such as surrounding air) instead of as part of the desired reaction. In both scenarios, it is often the case that the person interested in having the reaction performed has to use an excessive amount of the quicklime to get the result they want, and that can become expensive.

One concern in the production of calcium oxide is that chemical analysis of the oxide is often insufficient to determine if it meets all the needs of the various process into which it is to be used. Basically, because the calcium oxide is being used in a chemical reaction process, one would presume that calcium oxide products that are chemically similar should perform identically. However, it has been found that sometimes the physical properties (reactivity, particle size distribution, surface area, pore volume, etc.) of the calcium oxide have actually proven more important to its performance in the chemical reaction process. In many cases, this can be intuitive. For example, the same mass of a calcium oxide which has been pulverized to a smaller size is generally expected to have more surface area (per unit mass) than a larger particle sized counterpart. Thus, for reaction activities where surface area is relevant, a greater surface area composition would presumably work better regardless of similarity of chemical composition.

It is believed that there are numerous important properties in calcium oxide that have no relation to chemical analysis. There are numerous changes in the physical structure of the resultant lime that appear to be a direct result of the conditions under which the limestone was subjected to during the thermal decomposition (calcination) process that formed the quicklime from raw limestone (calcium carbonate or $CaCO_3$). Further, these changes can result in quicklime products with a variety of different reactivity and uses.

Lime calcination generally is performed in some form of lime kiln. There are a large number of different types of lime kiln designs available in modern calcium oxide production. Some designs are little changed from processes used hundreds of years ago, while others are of relatively modern design. While there are a huge number of different kilns, most industrial processes use only a relatively small number of different designs and the designs are often selected based on desired output, and available input, as certain types of kilns are better for producing calcium oxide with certain qualities and characteristics, and for operating on certain kinds of limestone feed stocks.

Regardless of the design, kilns are generally focused on two main types of operation, rotary or vertical shaft, and utilize a continuous inflow of limestone and outflow of calcium oxide. The systems are traditionally characterized by providing a counter-current flow of solids and gases and usually utilize three stages of action in the lime burning process. The first stage is a preheating zone where the feed stock limestone is heated to a temperature generally above 800° C. by exposure to escaping exhaust gases from actions later in the structure. In the calcining zone, the limestone is heated to above 900° C. (and commonly 1000° C.) to cause the calcination. The resultant calcium oxide (quicklime) is then cooled in the third zone to prepare the quicklime for removal from the kiln. This is discussed in more detail in documents such as those available at www.roadbondsoil.

In the lime calcination process, differences in resultant physical product have generally been linked to the specific temperature to which the source limestone is exposed in the calcining zone and to the specific particulate qualities of the limestone. In theory (which is basically operation under idealized conditions), during the calcination process, the applied heat causes so great of a molecular activity in the atoms making up the molecules of limestone ($CaCO_3$) that the $CO_3$ ion is broken up. The $CO_2$ molecules escape as a gas, while the remaining oxygen atom becomes the appropriate part of the CaO structure. The action of the $CO_2$ egress from the molecule creates a hole or "pore" in the surface of the quicklime particle. The size of this hole then serves to increase the surface area of the particle, which can assist in the reactivity speed of the quicklime.

While the theory is well understood and appears sound, the practical environment inside a lime kiln can disagree with the theory. In the first instance, the limestone feed into a lime kiln is not of consistent size. It is near impossible to generate any form of particulate product with a uniform particle size. Instead, particles, such as feed limestone, are generally crushed or pulverized to a particle size distribution that is within certain parameters acceptable to the specific kiln and desired output. This means that the feedstock limestone includes a majority of particles within a certain, often fairly narrow, size band, but will also still include a number of particles both smaller and larger than the band.

The feed stock also can include a number of impurities (materials which are not limestone) of a variety of sizes and chemical compositions. These can also alter the calcining process due to these impurities not being part of the calcining reaction and potentially interfering with the process. Further, the impurities' presence (or not) can also actually alter the physical characteristics of the limestone component of the feed. For example, if an impurity is particularly hard, pulverizing a mixed feed of limestone and a large amount of the impurity to a narrow band may actually result in the limestone portion of the composition being only in the smaller part of the band and having a narrower distribution, while the exact same process and an output with identical physical distribution, but less of the impurity, can result in a wider band of the limestone particle distribution.

Further, in order to provide for operating efficiency, conservation of heating fuel, and reduced combustion emissions, most lime kilns, reuse heated air from one stage of the process to another. Thus, air heated by the cooling quicklime in the cooling zone is used as preheated air for the calcining zone. Further, the exhaust air from the calcining zone, generally including the released $CO_2$ from the calcining process, is used as the preheating air in the preheating zone. While this generally makes the kiln more energy efficient, it should be clear that it can make exact temperature control in each zone fairly complex. As the calcining process is generally a continuous operation, the temperature will generally fluctuate within the calcining zone (as well as the other zones) depending on the specific parameters of the process at any instant and with simple movement of heat currents inside the kiln.

It should be apparent from the above description that taking into account the variability of limestone particle sizes and composition along with the variability of specific heat within a zone (both globally in the zone, and due to specific heat currents moving through the zone), it is very difficult to produce an ideally consistent quicklime product, particularly from two feed-stocks sourced from different geographic locations.

If a particle is exposed to too little heat (or is too big), the core of the limestone can remain calcium carbonate and only the outside converts to calcium oxide. This is commonly referred to as an output which is "rocky." Alternatively, overexposure to heat can result in the lime losing reactivity. Specifically, if the lime is exposed to sufficient heat, the surface can vitrify, which can make it less reactive as it is hard for water to penetrate the hard surface. Lime which has been desirably burned for high reactivity is often referred to as "soft burned" while that which has been exposed to a greater amount of heat is often referred to as "hard burned" or "dead burned" if exposed to an excessive amount of heat. Between hard and soft is "medium burned".

Classification of quicklime into the various categories is often based on the ASTM C-110 standard which provides for the degree rise in temperature in 30 seconds and 180 seconds (referred to as R30 and R180) for the quicklime in a hydration reaction. Soft burned lime is generally classified as that which has an R30 of 15 degrees or greater, medium burned lime is typically around 13-14 degrees, and hard burned lime is generally less than that. Similarly, a soft burned lime typically has a R180 of greater than 40 degrees, a medium burned lime has an R180 of 30 to 40 degrees, and a hard burned lime has an R180 of less than 30 degrees. Rocky quicklime is generally incompletely reacted and can be classified on that ground instead of using R30 or R180 values.

Because of the variations in limestone particle size and the uneven nature of most heating, the quicklime produced by most lime kilns, like the limestone product that goes in, is generally produced as a particulate with a number of distributions related to particle size, burn time, and a variety of other factors. The output of a kiln is routinely pulverized prior to classification, and this "kiln discharge" has been found to have a relatively broad distribution of particle burns. Further, the kiln discharge can vary heavily throughout runs due to variation in inputs as well as heat changes. Consecutive runs can often see swings of 2-3 times as much production of hard vs. soft burned material, even with relatively consistent input streams.

Because the output has a wide variety of burn levels, applications to which the quicklime is put have to deal with some level of deviation from their ideal rate. That is, the process for the quicklime must be designed to accept that some of the particles in the distribution provided, regardless of how well it is manufactured, may be burned insufficiently (rocky) while still others will be hard burned. If that causes changes in the reaction, or results in impurities in the resultant material, the manufacturing process has to take such things into account and will generally produce an end product that is within a range of acceptable impurities from imperfectly reacted quicklime. It should be apparent that this range is generally a middle ground as going too far one direction or another can create new problems.

In certain applications, however, it is desirable to utilize only soft burned lime, while in other processes, hard burned lime is desired and, in still other processes, medium burned lime is desirable. For example, in hydration reactions, quicklime as a particle scrubber in flue gases, or propionate or rubber formation reactions, faster reaction times (and thus soft burned quicklime) are generally desired. Alternatively, in applications such as the generation of autoclave (aerated) concrete or for food additives, a medium burn of quicklime is often desired because, if these reactions are too fast or too slow, a less desirable product can be produced. Finally, in applications such as moisture scrubbers or for detergent additives for petroleum products, hard burned lime is generally desirable, as a slow reaction is desired to prevent potential dangers and to provide stability.

Regardless of the type of quicklime desired for an application, it has been generally considered cost-prohibitive to try and segregate quicklime by the degree of burn in the kiln discharge. Methods such as manual or automatic optical sorting of kiln discharge can provide for a more consistent quicklime product (e.g., soft, medium, or hard burned), but can be very expensive to implement and, therefore, raw output is often classified as a single product based on where it "better" falls. In most cases, this makes the end product a medium burned product, even though the product will include a not insubstantial amount of soft and hard burned product. It would not be surprising for a medium burned product to actually only have 30-40% of its particles actually be medium burned particles, but to then have a distribution of particles that are hard and soft burned as well. The distribution of these will often depend on if a more or less reactive product is easier to use.

Instead of sorting quicklime particles after they are produced, in order to produce more particular products (e.g., those that are more consistently soft or hard burned), the inputs are generally more rigidly controlled, or kiln operating parameters are altered, to produce particular end products. To better control the variables, improved feedback loops are often provided to more accurately monitor and adjust temperatures in real time. Further, limestone may be processed in particularly sized batches or load speeds to provide for more consistent control or at least trend the output in a particular direction. For example, if hard burned product is more desirable, internal temperature and residence time for the lime can be increased, or smaller limestone inputs can be provided. Alternatively, if soft burned product is more desirable, more exacting control of temperature in the calcining zone may be implemented and the residence time of the limestone input in the kiln can be reduced.

Still further, limestone inputs may be much more processed, screened, and evaluated prior to the kiln to provide for a more uniformly sized feedstock where particular burn outcomes are desired. In this way, the input particle size distribution is narrower. Thus, residence times and heat set for a median particle size are more likely to not result in a substantial difference in properties for a large number of the particles present. While any of these methods can prove effective at producing a more consistent quicklime that has a narrower size band and a higher probability of particles with a particular burn profile, they generally also impose substantial additional costs on the production due to inherent inefficiency (from increased control and processing). Kilns are also expensive and, in certain types of kilns, a higher calcination temperature combined with a shorter burn time coupled with issues like uneven heat distribution and inconsistent limestone/quicklime movement in the kiln can simply not be controlled enough to provide a consistent quality quicklime output. Thus, control of inputs is often limited to very particular, and commonly expensive, quicklime products.

Because of all the above problems, a variety of solutions have been proposed which provide for better control of the reaction time of the quicklime without altering the characteristics of the quicklime. In particular, the use of additives of various types in the resulting lime reaction allows for the reactivity of the lime to be controlled externally. Patents such as U.S. Pat. Nos. 6,395,205 and 4,464,353, the entire disclosures of which are herein incorporated by reference, are directed to certain additives to control the speeds of certain types of lime reactions. Further, U.S. Pat. No. 5,616,283, the entire disclosure of which is herein incorporated by reference, is directed to an additive to control viscosity of a hydrated lime. Notably, viscosity is a property that has been an issue in certain commercial reactions and is related to the burn characteristics of the lime.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Because of these and other problems in the art, there is a need for systems and methods to effectively sort quicklime particles to produce products with more consistent size and burn time characteristics after the quicklime particles have been created without the use of additives. Specifically, such systems and methods would preferably allow for calcined lime (quicklime) to be sorted into softer burned and harder burned fractions after the fractions are burned in the kiln together.

There are described herein among other things, systems and methods for separating soft burned quicklime from hard burned quicklime, one such method comprising: grinding a limestone feedstock including limestone and impurities to a first size; calcining said limestone in said limestone feedstock to produce a quicklime; milling said quicklime into a quicklime particulate, said quicklime particulate having between about 80% and about 90% of its particles smaller than 100 mesh; separating said quicklime particles which are smaller than 100 mesh from a remainder which is larger than 100 mesh, said quicklime particles which are smaller than 100 mesh having a size distribution with two peaks in a bimodal distribution; and running said quicklime particles which are smaller than 100 mesh through a classifier to separate said quicklime particles which are smaller than 100 mesh into a soft burned and a hard burned fraction separated by a dividing point, said soft burned fraction being particles smaller than said dividing point and said hard burned fraction being particles larger than said dividing point; wherein said dividing point is between said two peaks in said bimodal distribution.

In an embodiment of the method, the dividing point is defined by a specific particle size which may be between about 4 and about 7 microns.

In an embodiment of the method, the dividing point is defined as a size under which a percentage of particles in said remainder is below, which percentage may be 20%.

In an embodiment of the method, the soft burned fraction has an R180 of greater than 40 degrees.

In an embodiment of the method, the hard burned fraction has an R180 of less than 30 degrees.

In an embodiment, the method further comprises: grinding said remainder to a size which is smaller than 100 mesh; and classifying said ground remainder as a very hard burned fraction.

In an embodiment, the method further comprises: selecting a second dividing point; and removing from said soft burned fraction a medium burned fraction, said medium burned fraction being particles larger than said second dividing point. The soft burned fraction may have an R180 of greater than 40 degrees, said medium burned fraction may have an R180 between 30 and 40 degrees, and said hard burned fraction may have an R180 of less than 30 degrees.

In an embodiment, the method further comprises: selecting a second dividing point; and removing from said hard burned fraction a medium burned fraction, said medium burned fraction being particles smaller than said second dividing point. The soft burned fraction may have an R180 of greater than 40 degrees, said medium burned fraction may have an R180 between 30 and 40 degrees, and said hard burned fraction may have an R180 of less than 30 degrees.

BRIEF DESCRIPTION OF THE DRAWINGS

FIG. 4 depicts the reaction characteristics of the raw lime, and each of the fractions of FIGS. 2 and 3. Reactivity is shown based on specifics of reacting the various compositions with water in slaking. The particle size distributions are also provided numerically, and the BET surface area and pore volume for the various compositions are also provided.

DETAILED DESCRIPTION OF THE PREFERRED EMBODIMENT(S)

Figure 1:
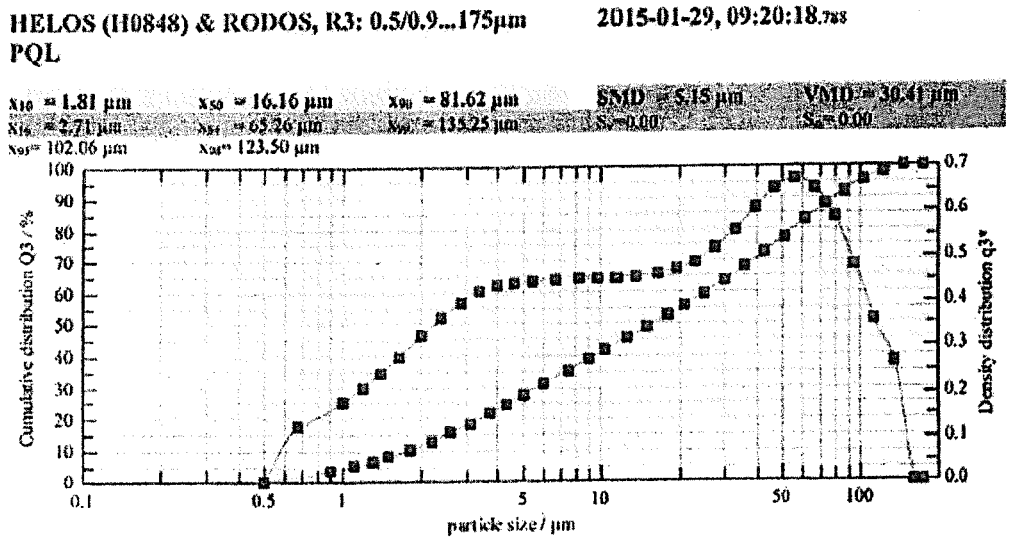
FIG. 1 depicts a particle size distribution of an embodiment of a raw quicklime kiln discharge pulverized to approximately 80-90% passing a 100 mesh screen.

Hard burned lime is generally believed to be created because "pores" created in the particle due to the CO2 gas escaping close. Thus, the surface becomes impervious as there is no point at which another molecule can enter. With the CO2 removal and the molecular re-alignment in the calcining zone, the void space created in a very soft burned, un-shrunken, lime particle can be around 56% of the total volume. As the lime is subjected to higher calcination temperatures, the interconnecting voids and open pores between the CaO crystals begin to shrink.

In a soft burned lime, it is also believed that the individual CaO crystals are loosely packed and joined only by point contact. With increasing heat, the point contact between crystals becomes more of a surface-to-surface contact. The initial small crystals formed in soft burning begin to grow at the expense of adjacent particles, getting larger and more firmly bound. The compressive strength of lime, and therefore the resistance to breakage, is greatly affected by the crystal re-alignment and growth. Soft burned lime with loosely joined crystals generally has a low compressive strength, while a hard burned lime with the larger firmly bound consolidated crystals (agglomerates) is very resistive to breakage.

This difference in compressive strength can be used to categorize lime in a novel fashion. Once quicklime has been produced by a kiln, the quicklime is often pulverized to produce a kiln discharge lime with a particular size distribution. Because of the compressive strength difference between lime types, it has been found that it is possible to first pulverize the raw quicklime output and then use air classification or other separation technology to separate the quicklime into at least two fractions. Depending on the embodiment, the fractions may classify the lime where particles are either above or below a certain size, or where a certain percentage of the raw lime is provided into a certain fraction. Such size classification has been found to produce a fine fraction that is dominated by soft burned particles, and a coarse fraction dominated by hard burned particles. This allows for both fractions to have improved usefulness over their original mixture. Further, a middle fraction can also be produced which is dominated by middle burned lime in a still further embodiment. Being able to provide for a quicklime product which is dominated (e.g., a vast majority of particles meet that criteria) by a particular type of burn allows for specialty products to be provided from any lime discharge without as much control of the inputs. Thus, lime products can be provided which provide particular reaction characteristics, and or related characteristics such as hydrate viscosity.

In an embodiment of the systems and methods, the raw quicklime is first ground to a fineness of around 80-90% minus 100 mesh. This can allow for removal of impurities and other particularly large particles initially. Particles above 100 mesh (10-20% generally) is removed and generally provides a very hard burned product and a relatively large particle size. The particles are generally too big for commercial applications, but this product can be further crushed separately to remove impurities and to produce a very hard burned quicklime or even dead burned quicklime of desirable size.

The remaining 80-90% that passed the 100 mesh filter is processed through an air classification system or other separation technology that serves to separate the particulate into at least two fractions. Generally, two fractions will be used. A coarse fraction will comprise a greater percentage of larger agglomerates and heavier hard burned lime which is separated from the fine fraction which comprises a greater percentage of softer smaller agglomerates, and lighter soft burned quicklime. The finer fraction, which comprise a much higher percentage of soft burned lime, can be provided as a far more reactive product, while the coarser fraction, which tends to include a greater percentage of hard burned lime and larger agglomerates, can be used in applications where greater compressive strength, or less reactivity, is desired. In an alternative embodiment, three factions may be used to provide a medium burned center fraction.

The results of an exemplary separation of an above 100 mesh fraction, and then a separation of the particles below 100 mesh into two fractions, are shown in the FIGS. FIG. 1 shows the particle size distribution of raw quicklime particles after they are removed from a kiln (kiln discharge), pulverized, and categorized to remove particles above 100 mesh. As can be seen in FIG. 1, there is a relatively broad distribution of particles in the below 100 mesh fraction indicating that the raw kiln discharge is not particularly well suited for either applications for soft burned or hard burned lime. It should also be noted that the distribution is slightly bimodal with two possible peaks. These two peaks can be separated and in FIG. 2, the distribution of the coarse (hard burned) peak fraction is shown, while in FIG. 3 the distribution of the fine (soft burned) peak fraction is shown.

It should be recognized that the specific cutoff between the coarse and fine fractions will generally depend on the specific preference for soft vs. hard burned lime, desired reaction times or reactivity, and other characteristics of the lime dictated by the resultant use to which it is to be put. Higher separation points will generally allow for more hard burned lime to be present in the fine fraction, but will allow for more of the resultant quicklime to be provided as part of the fine fraction and can be used to select particular reaction times for processes where pure reactivity is not necessarily as important as known reactivity. Lower separation points can provide for removal of a much greater percentage of hard burned lime from the soft burned fraction, but will often sacrifice lime that may be sufficiently soft burned to still be useable for certain applications. Thus, the specific cut-off line for division of soft and hard burned (fine and coarse) fractions will generally be a matter of design choice depending on the specific application and process to which the lime is to be put. However, the separation point will generally be between the two peaks.

Depending on embodiment, the fractions may be separated by either of two methods. In the first method, a particular size particle is used as a cut-off between the fractions. Thus, the coarse fraction could be defined as being all the particles larger than a particular size, for example, larger than about 4 to about 7 microns. Again, it should be recognized that the indicated size is merely exemplary and any size may be used as the cut-off. Alternatively, instead of selecting a particular size cut off into which to divide the particulate into the two fractions, the fractions may instead be selected based on a percentage ratio. Thus, instead of selecting to separate the particle distributions into two distributions based on a particular cutoff size, the fractions may instead be separated by removing a finest (or coarsest) fixed percentage. In particular, the percentage cutoff may be chosen where the fine fraction is selected to be the finest 10%, 20%, 25%, 30% or any other amount of the raw product. This type of arrangement, however, can be problematic in that the location of the "middle fraction" may move and certain batches may still be more reactive than others.

Figure 2:
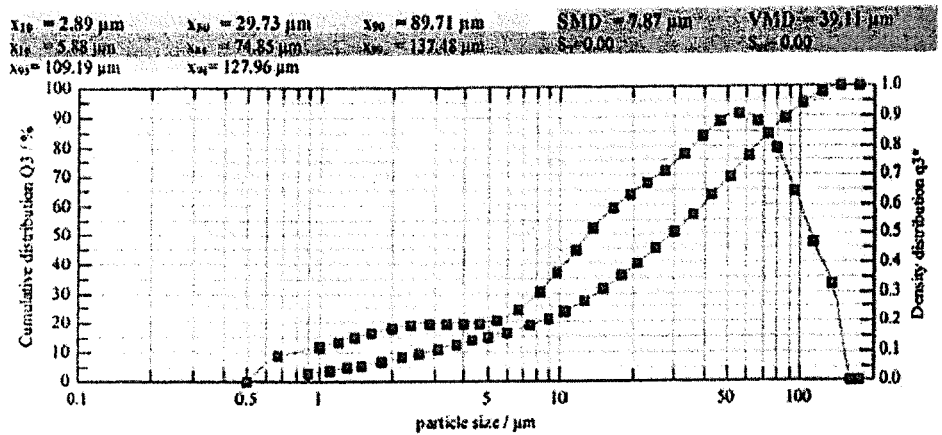
FIG. 2 depicts a particle size distribution of an embodiment of the coarse component of the distribution of FIG. 1. In this embodiment, the coarse component was selected as the coarsest about 80% of the raw output. Specifically, it was the coarsest 78.3% of the output.
Figure 3:
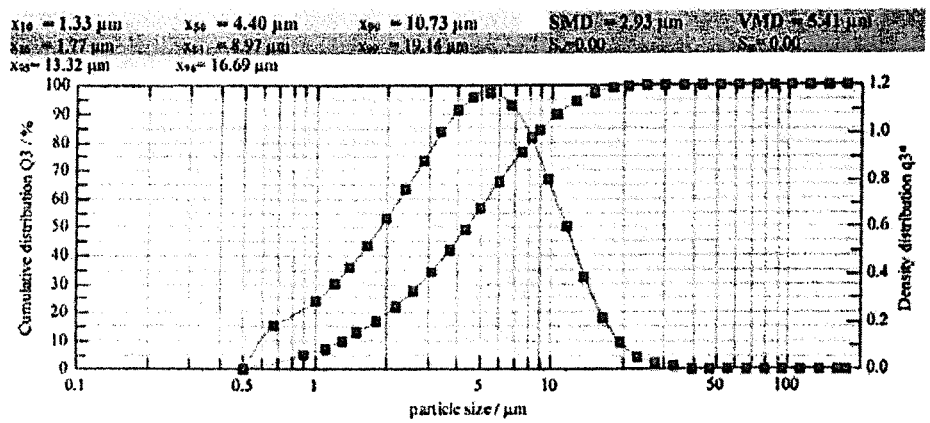
FIG. 3 depicts a particle size distribution of an embodiment of the fine component of the distribution of FIG. 1. In this embodiment, the coarse component was selected as the finest about 20% of the raw output. Specifically, it was the finest 21.7% of the output.

In the classification of the distribution of a raw quicklime output from the kiln as shown in the FIGS. such a percentage separation was used. In particular, the smallest about 20% of the distribution was removed as the fine fraction and the remaining about 80% was used as the coarse fraction. The raw quicklime prior to classification is shown in FIG. 1. As should be apparent, the distribution is quite wide. The coarse fraction's distribution is shown in FIG. 2 and it should be apparent that there are still particles down to the minimum sizes detected in FIG. 1. However, the majority of the particles have become larger and the fine tail is much smaller. Similarly, FIG. 3 shows the fine fraction which is smaller and softer burned high reactive lime. Again, there is still a distribution of particles, but the distribution of the fine portion of FIG. 3 shows a much more classic normal distribution (bell curve) than was present in either of the other two distributions.

The specific distributions within the fine and coarse fractions will generally depend on the method of classification. In the embodiment of FIGS. 1-3, the two fractions were selected by removing the fine portion from the coarse portion via air classification (turbine classifier). This would commonly be used if the fine portion was considered the more valuable, or the one that had more demanding requirements. By selecting this as the controlled fraction (the one which is detected and removed from the other) the fine fraction generally has the coarse particles cut out, while the coarse fraction may still have a few finer particles. Specifically, the classification in this case is concerned that the fine portion not include coarse particles and reduces their presence by allowing the coarse portion to have some fine particles. In alternative embodiments, the reverse could be true and the coarse portion could be controlled, providing that the coarse fraction have fewer fine particles at the expense of the fine portion having some coarser particles.

In a further embodiment, if a middle fraction was desired, the middle fraction could be determined by first removing the finest fraction from the coarse and setting this aside. The coarse fraction could then be classified to remove the coarsest portion and that can be set aside. The remaining middle portion will generally include some of the finer portion (and some of the coarser) but will generally be expected to be primarily focused in the medium burned area.

FIG. 4 shows that, with the use of an air classification system and the methods described herein, the soft burned lime fraction was quite successfully separated from the remainder of the kiln discharge. Specifically, with an about 20% cut ratio, the BET surface area of the fine fraction was essentially double that of the coarse fraction (and quite a bit higher than the raw feed as a whole too), and the BET pore volume of the fine fraction was also more than double that of the coarse fraction (and also significantly higher than the raw feed). Thus, the fine fraction is much more highly reactive than the coarse fraction and more highly reactive than the discharge as a whole, and the fine fraction will include a much higher percentage of softer burned lime while the coarse fraction includes a much higher percentage of hard burned lime.

The connection with the size and the burn level is abundantly clear in FIG. 4. In FIG. 4, it can be seen that when the raw material, as well as each fraction separately, were slaked with water, they displayed very different reactivity. The fine fraction of FIG. 3 slaked significantly faster and better than either the raw feed and the coarse faction (which was clearly the slowest). As can be seen in the legend of FIG. 4, based upon the general classification of soft and hard burning particles based on slaking characteristics (e.g., R30 and R180), the fine fraction is clearly classified with a majority well into a soft burn particulate, while the coarse fraction has a majority well into a hard burn particulate.

As there are industries that desire a harder burned lime (e.g., petroleum additives) with a smaller soft burn fraction and others that desire only a softer burned fraction (e.g., for generating slaked lime), by using this system and method of classification refinement, both classified fractions are of greater value than the original feed to the appropriate industry as each fraction displays an increased percentage of the appropriate lime (soft or hard burned). It should now also be apparent that by changing the cut ratio (or the cut-off size) between the coarse and fine material (and by potentially adding an additional, or more, cut-off to separate middle fractions), the producer gains control over the specific reactivity and can actually provide a material with a selected BET surface area, BET pore volume, or any other specific physical characteristic based on the specifics of the industry or reaction which will use the quicklime.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A method for separating soft-burned quicklime from hard-burned quicklime, the method comprising:
   providing a quicklime particulate with a particle size smaller than 100 mesh, the quicklime particulate having a size distribution with two peaks in a bimodal distribution; and
   running said quicklime particles through a classifier to separate said quicklime particles into a soft burned and a hard burned fraction separated by a dividing point, said soft burned fraction being particles smaller than said dividing point and said hard burned fraction being particles larger than said dividing point;

wherein said dividing point is between said two peaks in said bimodal distribution.

2. The method of claim 1 wherein said dividing point is defined by a specific particle size.

3. The method of claim 2 wherein said dividing point is selected to be between 4 and 7 microns.

4. The method of claim 1 wherein said dividing point is defined as a size under which a percentage of particles in said remainder is below.

5. The method of claim 4 wherein said percentage is about 20%.

6. The method of claim 1 wherein said soft burned fraction has an R180 of greater than 40 degrees.

7. The method of claim 6 wherein said hard burned fraction has an R180 of less than 30 degrees.

8. The method of claim 1 further comprising:
selecting a second dividing point; and
removing from said soft burned fraction a medium burned fraction, said medium burned fraction being particles larger than said second dividing point.

9. The method of claim 8 wherein said soft burned fraction has an R180 of greater than 40 degrees, said medium burned fraction has an R180 between 30 and 40 degrees, and said hard burned fraction has an R180 of less than 30 degrees.

10. The method of claim 1 further comprising:
selecting a second dividing point; and
removing from said hard burned fraction a medium burned fraction, said medium burned fraction being particles smaller than said second dividing point.

11. The method of claim 10 wherein said soft burned fraction has an R180 of greater than 40 degrees, said medium burned fraction has an R180 between 30 and 40 degrees, and said hard burned fraction has an R180 of less than 30 degrees.

12. A system for separating soft-burned quicklime from hard-burned quicklime, the system comprising:
a quicklime particulate with a particle size smaller than 100 mesh, the quicklime particulate having a size distribution with two peaks in a bimodal distribution; and
means for separating said quicklime particles into a soft burned and a hard burned fraction separated by a dividing point, said soft burned fraction being particles smaller than said dividing point and said hard burned fraction being particles larger than said dividing point;
wherein said dividing point is between said two peaks in said bimodal distribution;
wherein said soft burned fraction has an R180 of greater than 40 degrees; and
wherein said hard burned fraction has an R180 of less than 30 degrees.

13. The system of claim 12 wherein said dividing point is defined by a specific particle size.

14. The system of claim 13 wherein said dividing point is selected to be between 4 and 7 microns.

15. The system of claim 12 wherein said dividing point is defined as a size under which a percentage of particles in said remainder is below.

16. The system of claim 15 wherein said percentage is about 20%.

* * * * *

UNITED STATES PATENT AND TRADEMARK OFFICE
CERTIFICATE OF CORRECTION

| | | |
|---|---|---|
| PATENT NO. | : 11,865,583 B1 | |
| APPLICATION NO. | : 16/378216 | |
| DATED | : January 9, 2024 | |
| INVENTOR(S) | : Mark DeGenova, Randy J. Griffard and David Venhaus | |

It is certified that error appears in the above-identified patent and that said Letters Patent is hereby corrected as shown below:

In the Specification

Column 2, Lines 47 - 48 should read -- This is discussed in more detail in documents such as those available at http://www.roadbondsoil.com --.

Signed and Sealed this
Twenty-sixth Day of March, 2024

Katherine Kelly Vidal
*Director of the United States Patent and Trademark Office*